United States Patent
Okamoto et al.

(10) Patent No.: US 10,940,937 B2
(45) Date of Patent: Mar. 9, 2021

(54) AIRCRAFT REINFORCING STRUCTURE

(71) Applicant: Mitsubishi Aircraft Corporation, Aichi (JP)

(72) Inventors: Hiromu Okamoto, Tokyo (JP); Masayoshi Suhara, Tokyo (JP); Ryuichi Nagase, Tokyo (JP); Toshikazu Shigetomi, Tokyo (JP); Morimasa Ishida, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 184 days.

(21) Appl. No.: 15/041,503

(22) Filed: Feb. 11, 2016

(65) Prior Publication Data

US 2016/0236768 A1    Aug. 18, 2016

(30) Foreign Application Priority Data

Feb. 13, 2015   (JP) .............................. JP2015-026298

(51) Int. Cl.
    *B64C 3/26* (2006.01)
(52) U.S. Cl.
    CPC ..................... *B64C 3/26* (2013.01)
(58) Field of Classification Search
    CPC ....... B64C 3/26; E04C 2/365; B29C 66/7254; B32B 3/12; B32B 7/12
    USPC .................................................. 244/123.13
    See application file for complete search history.

(56) References Cited

U.S. PATENT DOCUMENTS

| | | | | | |
|---|---|---|---|---|---|
| 2,939,944 | A | * | 6/1960 | Eggert, Jr. ................ | B64C 3/00 219/78.12 |
| 3,771,748 | A | * | 11/1973 | Jones ........................ | B64C 3/00 244/123.13 |
| 4,249,976 | A | * | 2/1981 | Hudson ..................... | B32B 3/12 156/286 |
| 5,445,861 | A | * | 8/1995 | Newton .................... | B32B 3/12 428/116 |
| 5,888,610 | A | * | 3/1999 | Fournier ................... | E04B 1/86 156/292 |

(Continued)

FOREIGN PATENT DOCUMENTS

JP       2014-188993       10/2014

OTHER PUBLICATIONS

Japanese Office Action for Application No. 2015-026298, dated Jan. 8, 2019.

*Primary Examiner* — Medhat Badawi
*Assistant Examiner* — Vicente Rodriguez
(74) *Attorney, Agent, or Firm* — Pearne & Gordon LLP

(57) ABSTRACT

An object of the present invention is to prevent accumulation of moisture which has entered inside a honeycomb sandwich panel used for a stressed-skin structure of an aircraft. A reinforcing structure includes an outer panel constituting an outer shell of a tailplane and a honeycomb sandwich panel reinforcing the outer panel. The honeycomb sandwich panel includes a honeycomb core having a plurality of cells, an outer skin joined on the front side of the honeycomb core and disposed on the side of the outer panel, and an inner skin joined on the back side of the honeycomb core and disposed on the inner side of the tailplane. The inner skin has drainage channels formed therein through which each of the plurality of cells communicates with the outside of the honeycomb sandwich panel.

11 Claims, 5 Drawing Sheets

(56) References Cited

U.S. PATENT DOCUMENTS

| | | | |
|---|---|---|---|
| 6,743,497 B2 * | 6/2004 | Ueda | B32B 3/12 |
| | | | 428/116 |
| 2003/0146346 A1 | 8/2003 | Chapman, Jr. | |
| 2014/0290831 A1 | 10/2014 | Hatano et al. | |

* cited by examiner

AIRCRAFT REINFORCING STRUCTURE

BACKGROUND OF THE INVENTION

Field of the Invention

The present invention relates to a technique for discharging moisture which has entered inside a stressed-skin structure represented by a wing of an aircraft.

Description of the Related Art

In a stressed-skin structure of an aircraft, for example, a wing, moisture can enter inside the stressed-skin structure through a fastener hole which is penetrated by a fastener fixing a skin to a reinforcing member. Normally, this moisture remains frozen while the flight altitude is high and melts when the aircraft lands on the ground. Accordingly, as the aircraft continues operation, water having entered it freezes and melts repeatedly and, depending on the position of freezing, may cause a decrease in structural strength and damage to the structure.

In particular, moisture may enter inside a honeycomb sandwich panel, which is used as a reinforcing structure of an outer panel called a skin of a stressed-skin structure, and cause a decrease in structural strength. In this case, the scale of repair is significant, as it is necessary to partially replace the honeycomb sandwich panel at the location where the moisture has entered by, for example, the method disclosed in Japanese Patent Laid-Open No. 2014-188993. Moreover, if moisture has entered the honeycomb sandwich panel, a treatment for drying up this moisture is required. However, the pressure inside the honeycomb sandwich panel increases as the moisture is vaporized, which may damage the honeycomb sandwich panel.

Being an important structural member, the honeycomb sandwich panel of a wing having a stressed-skin structure requires approval of the authorities to repair, and reliable work is required for the repair. Drying up moisture also requires careful work so as not to damage the honeycomb sandwich panel, and accordingly takes long working hours.

It is therefore an object of the present invention to prevent accumulation of moisture which has entered inside a honeycomb sandwich panel used for a stressed-skin structure of an aircraft.

SUMMARY OF THE INVENTION

A honeycomb sandwich panel serving as a reinforcing member of an outer panel of a stressed-skin structure used in an aircraft is applied as a reinforcing member for coping with changes in external pressure. This honeycomb sandwich panel is composed of a honeycomb core, an outer skin joined on the front side of the honeycomb core, and an inner skin joined on the back side of the honeycomb core. The outer skin is disposed on the side of the outer panel. This honeycomb sandwich panel functions as a reinforcing member, and the outer skin can provide reinforcement alone so that the rigidity of the inner skin can be reduced. Therefore, to prevent moisture having entered the honeycomb sandwich panel from accumulating inside the panel, the present invention is provided with drainage channels through which moisture having been vaporized naturally or forcedly is delivered to the outside of the honeycomb sandwich panel. The provision of these drainage channels makes it possible to avoid increase in pressure inside the honeycomb sandwich panel and resulting damage to the sandwich panel even when moisture is forcedly dried up.

A reinforcing structure of an aircraft of the present invention includes an outer panel constituting an outer shell of an airframe of the aircraft and a honeycomb sandwich panel reinforcing the outer panel.

The honeycomb sandwich panel in the present invention includes a honeycomb core having a plurality of cells, an outer skin joined on the front side of the honeycomb core and disposed on the side of the outer panel, and an inner skin joined on the back side of the honeycomb core and disposed on the inner side of the structure. The inner skin of the present invention has drainage channels formed therein through which each of the plurality of cells communicates with the outside of the honeycomb sandwich panel.

According to the reinforcing structure of the present invention, moisture having entered inside the honeycomb sandwich panel is discharged through the drainage channels to the outside of the honeycomb sandwich panel. Thus, since accumulation of moisture inside the honeycomb sandwich panel can be prevented, damage to the honeycomb sandwich panel caused by freezing of accumulated moisture can be prevented. Moreover, even when the treatment of forcedly heating and drying up moisture during parking is performed, as the vaporized moisture is discharged through the drainage channels, it is unlikely that the pressure inside the honeycomb sandwich panel increases and causes damage to the honeycomb sandwich panel.

In the case where the reinforcing structure of the present invention reinforces an outer panel of a wing of the aircraft, the outer panel is composed of an upper outer panel and a lower outer panel disposed on the lower side of the upper outer panel, and the upper outer panel and the lower outer panel are each provided with the drainage channels in the inner skin of the honeycomb sandwich panel which is provided with the outer skin on the side of the outer panel.

The drainage channels in the reinforcing structure of the present invention can have the form of holes which respectively correspond to the cells and penetrate the inner skin in the thickness direction, or have the form of slits which are formed by disposing strip-shaped inner skins at intervals and formed across a plurality of cells.

According to the present invention, since the drainage channels are provided in the inner skin, moisture having entered inside the honeycomb sandwich panel vaporizes naturally during parking, for example, and is discharged through the drainage channels to the outside of the honeycomb sandwich panel. Thus, since accumulation of moisture inside the honeycomb sandwich panel can be prevented, damage to the honeycomb sandwich panel caused by freezing of accumulated moisture can be prevented.

Moreover, even when the treatment of forcedly drying up moisture is performed, as the moisture is discharged through the drainage channels, it is unlikely that the pressure inside the honeycomb sandwich panel increases and causes damage to the honeycomb sandwich panel.

DETAILED DESCRIPTION OF THE PREFERRED EMBODIMENT

In the following, the present invention will be described on the basis of the embodiment shown in the accompanying drawings.

Figure 1:
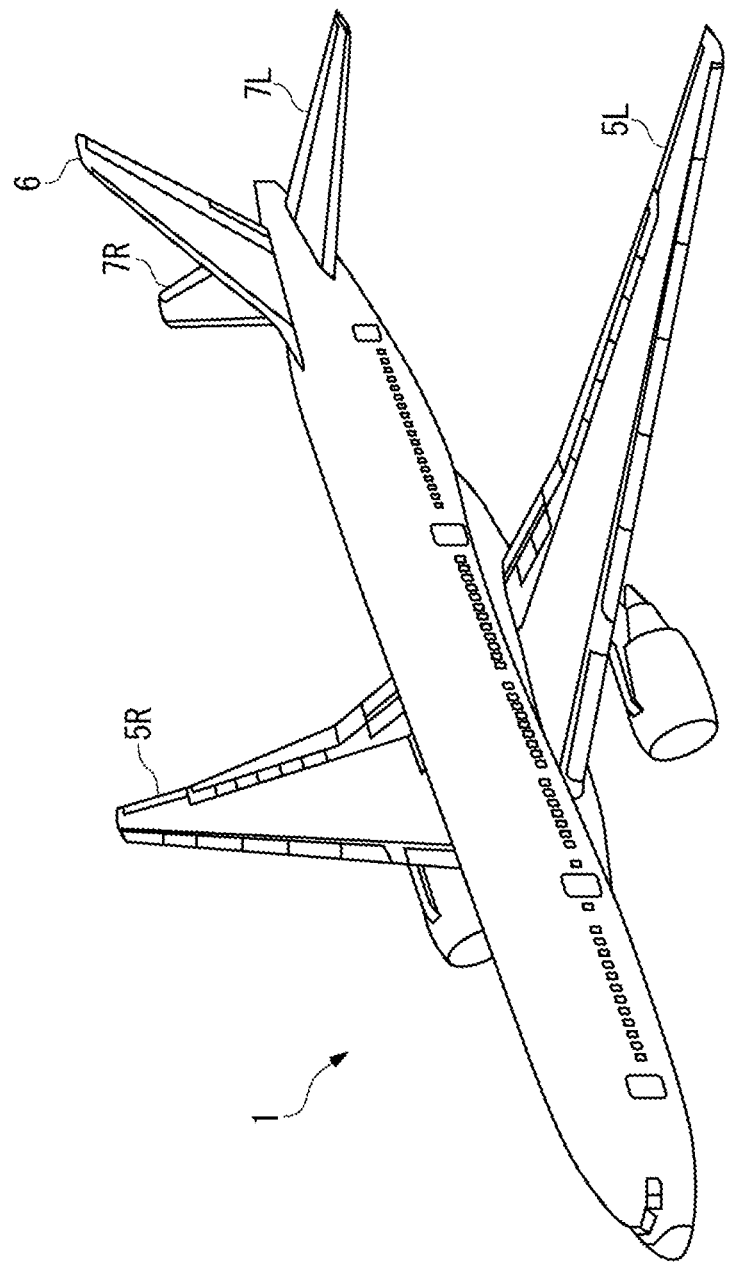
FIG. 1 is a perspective view showing the external appearance of an aircraft to which a stressed-skin structure in an embodiment is applied.

As shown in FIG. 1, this embodiment is applied to tailplanes 7L, 7R which are one of the stressed-skin structures of an aircraft 1, and relates to a structure which can discharge moisture having entered inside a honeycomb sandwich panel 10, which reinforces outer panels of the tailplanes 7L, 7R, from the honeycomb sandwich panel 10. While the tailplanes 7L, 7R are taken as an example here, the same drainage structure as this embodiment can also be provided in other parts of the aircraft 1.

Figure 2:
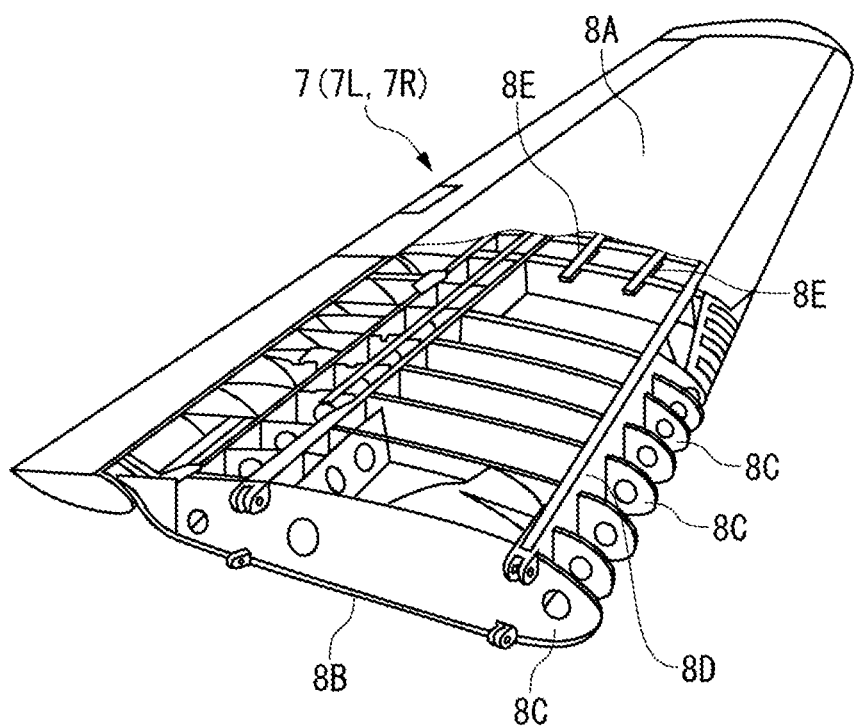
FIG. 2 is a view showing the internal structure of a tailplane in the embodiment.

As shown in FIG. 2, the tailplanes 7 (7L, 7R) each include an outer panel 8A and an outer panel 8B disposed on the upper side and the lower side, respectively, in the vertical direction, ribs 8C connecting between the outer panel 8A and the outer panel 8B, spar flanges 8D connecting the ribs 8C with one another in the wing length direction, and stringers 8E reinforcing the strengths of the outer panel 8A and the outer panel 8B, and thus the tailplanes 7 have a stressed-skin structure.

Figure 3A:
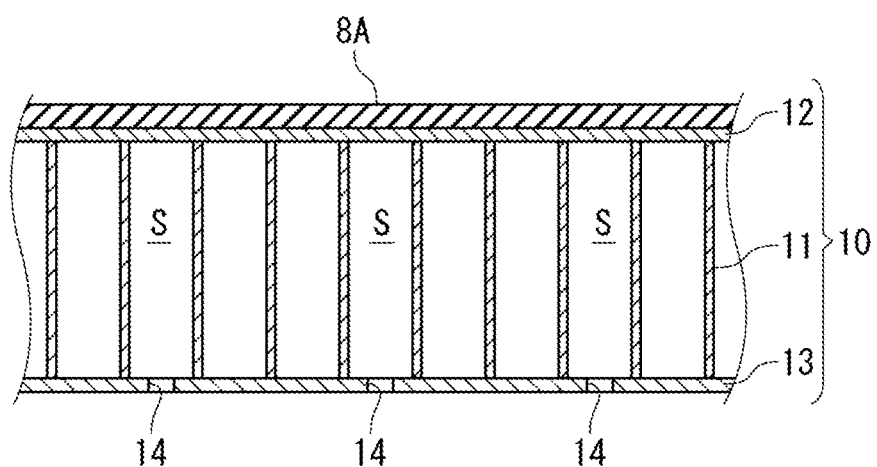
FIGS. 3A and 3B are cross-sectional views showing the configuration of an outer panel of the tailplane and a honeycomb sandwich panel reinforcing the outer panel in the embodiment.
Figure 3B:
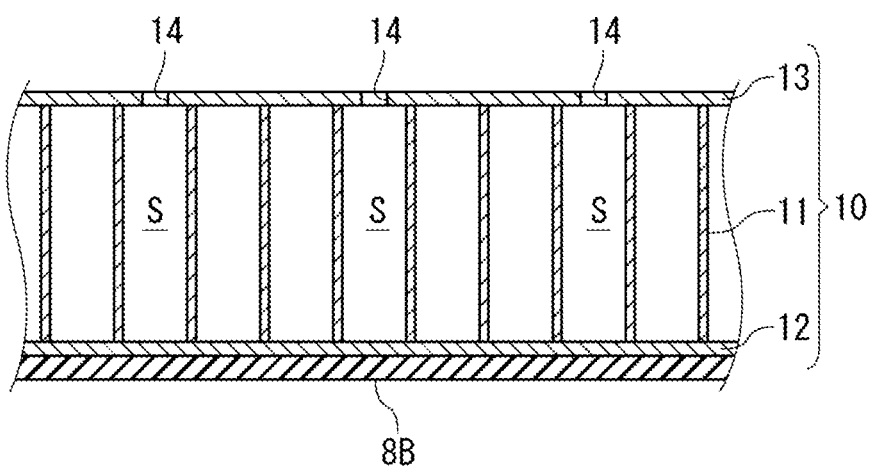

In the tailplanes 7L, 7R, a fastener F being a fastening tool is used as means for fixing the outer panels 8A, 8B and the ribs 8C with one another, and the fastener F is fastened with the rib 8C through a fastener hole which penetrates the outer panels 8A, 8B in the thickness direction. During flight of the aircraft 1, moisture in the atmosphere enters inside the tailplanes 7L, 7R through this fastener hole. As shown in FIGS. 3A and 3B, the honeycomb sandwich panel 10 is provided on the inner side of the outer panels 8A, 8B, so that the moisture having entered the tailplanes 7L, 7R also enters inside the honeycomb sandwich panel 10. Moisture having entered the tailplanes 7L, 7R including the honeycomb sandwich panel 10 is present in its solid phase, as ice, while the aircraft 1 is flying in regions of high altitude, and melts into its liquid phase, water, as the aircraft lowers its altitude for landing. As the aircraft 1 continues operation, it switches between a low altitude and a high altitude repeatedly, so that moisture having entered the tailplanes 7L, 7R freezes and melts repeatedly and, depending on the location of entry, may cause a decrease in structural strength. Therefore, to prevent accumulation of moisture having entered the tailplanes 7L, 7R, especially the honeycomb sandwich panel 10, an inner skin 13 of the honeycomb sandwich panel 10 is provided with drainage channels 14 in this embodiment.

As shown in FIGS. 3A and 3B, the honeycomb sandwich panel 10 is composed of a honeycomb core 11, and an outer skin 12 and the inner skin 13 which are joined on the front and back surfaces, respectively, of the honeycomb core 11. The honeycomb sandwich panel 10 has a laminated structure composed of the lightweight honeycomb core 11 and the high-strength outer skin 12 and inner skin 13, and is commonly used for aircraft parts for which light weight and high strength are required. The honeycomb core 11 has a form in which a large number of small holes are opened in a honeycomb shape at both end faces, and is made of an aluminum alloy, a resin, etc.

The outer skin 12 and the inner skin 13 are composed of fiber reinforced plastics (FRPs). For example, carbon fibers and glass fibers are used as reinforcing fibers, and especially carbon fiber reinforced plastics (CFRPs), for which carbon fibers are used as the reinforcing fibers, have high strength and a high elastic modulus as well as excellent corrosion resistance compared with other FRPs.

To produce the honeycomb sandwich panel 10, prepreg, which is a precursor of the outer skin 12 and the inner skin 13, is laminated on the front and back sides of the honeycomb core 11 through a resin adhesive (thermosetting resin). The prepreg is a laminate of a plurality of sheet members made of carbon fibers impregnated with an uncured resin. The laminate of the honeycomb core 11 and the prepreg is placed in an autoclave and the resin is cured under high temperature and high pressure to manufacture the honeycomb sandwich panel 10. Alternatively, the honeycomb sandwich panel 10 may be manufactured by laminating and curing in an autoclave only the prepreg in advance and then joining the prepreg with an adhesive to the front and back sides of the honeycomb core 11.

As shown in FIGS. 3A and 3B, in the honeycomb sandwich panel 10 of this embodiment, the outer skins 12 are disposed on the sides of the outer panels 8A, 8B, and the inner skins 13 are disposed inside the tailplanes 7L, 7R. Accordingly, in FIGS. 3A and 3B, the outer skin 12 of the honeycomb sandwich panel 10 attached to the upper outer panel 8A faces upward, while the outer skin 12 of the honeycomb sandwich panel 10 attached to the lower outer panel 8B faces downward, and the inner skins 13 of both outer panels 8A and 8B face the center in the thickness direction of the tailplanes 7L, 7R.

Figure 4A:
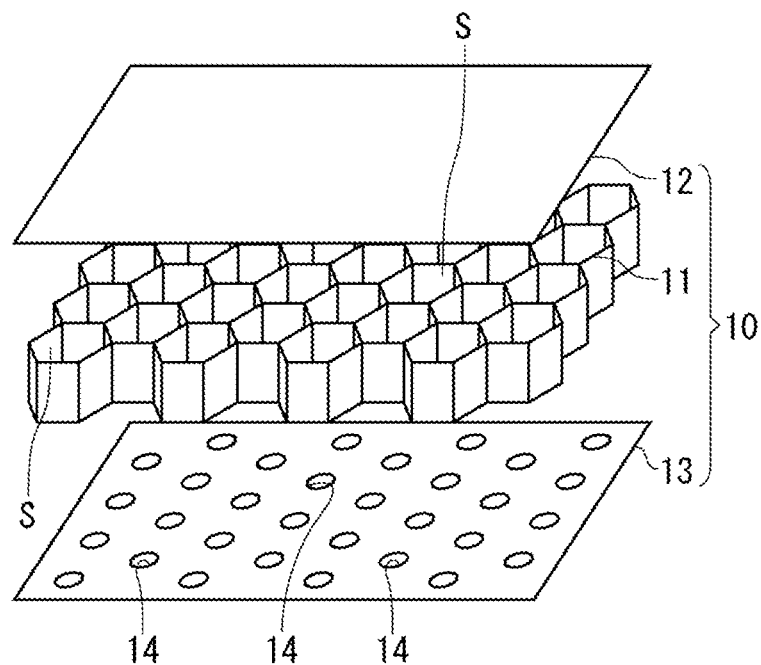
FIG. 4A is an exploded perspective view and FIG. 4B is a plan view, both showing the outer panel and the honeycomb sandwich panel of FIGS. 3A and 3B.
Figure 4B:
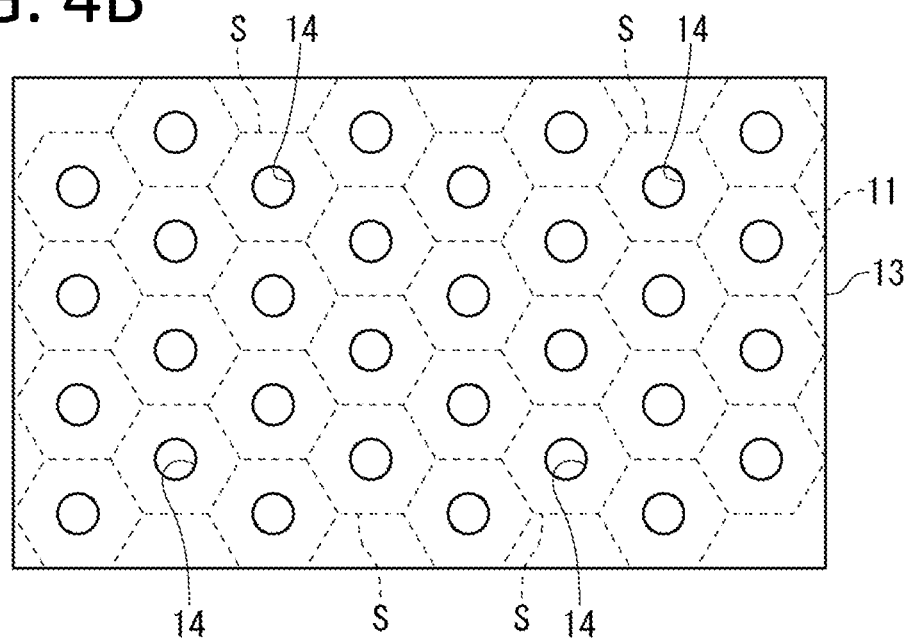

As shown in FIGS. 4A and 4B, in the honeycomb sandwich panel 10 of this embodiment, each of the outer panels 8A, 8B has the drainage channels 14 formed in the inner skin 13 which penetrate the inner skin 13 in the thickness direction. The drainage channels 14 are provided so as to respectively correspond to cells S composing the honeycomb core 11. That is, each of the cells S of the honeycomb core 11 necessarily communicates with the outer side of the inner skin 13 through the drainage channel 14.

Since the cells S communicate through the drainage channels 14 with the outer side of the inner skin 13, the honeycomb sandwich panel 10 provided in the tailplanes 7L, 7R of this embodiment can achieve the following effects.

First, moisture having entered inside the honeycomb sandwich panel 10 is discharged through the drainage channels 14 to the outside of the honeycomb sandwich panel 10. Thus, since accumulation of moisture inside the honeycomb sandwich panel 10 can be prevented, damage to the honeycomb sandwich panel 10 caused by freezing of accumulated moisture can be prevented.

Here, drainage through the drainage channels 14 includes at least the following two forms. The first form is a form in which moisture having melted during parking turns into droplets and is discharged through the drainage channels 14, and this form of drainage occurs in the honeycomb sandwich panel 10 attached to the upper outer panel 8A. The second form is a form in which vaporized moisture is discharged through the drainage channels 14, and this form includes a case of natural vaporization and a case of forced heating and vaporization. The second form of drainage occurs in both of the upper outer panel 8A and the lower outer panel 8B.

Even when the treatment of forcedly heating and drying up moisture during parking is performed, as the vaporized moisture is discharged through the drainage channels 14, it is unlikely that the pressure inside the honeycomb sandwich panel 10 increases and causes damage to the honeycomb sandwich panel 10.

Moreover, in this embodiment, since all the cells S of the honeycomb core 11 are provided with the drainage channel 14 without exception, whichever cell S moisture enters, the moisture can be discharged without fail to the outside of the honeycomb sandwich panel 10.

On the other hand, since the inner skin 13 with the drainage channels 14 drilled therethrough is provided, this embodiment can reduce the likelihood of entry of moisture into the honeycomb sandwich panel 10 as described below.

It can be said that a honeycomb sandwich panel 10 not provided with the inner skin 13 is equivalent to the honeycomb sandwich panel 10 including the drainage channels 14 and can discharge moisture having entered the honeycomb core 11. However, if the inner skin 13 is not provided, the humidity inside the honeycomb core 11 increases as the ambient humidity increases, so that moisture is likely to accumulate inside the honeycomb core 11. By contrast, if the inner skin 13 with the drainage channels 14 drilled therethrough is provided, since the humidity inside the honeycomb core 11 is insensitive to changes in ambient humidity, moisture is less likely to enter the honeycomb core 11 than when the inner skin 13 is not provided. Especially for the honeycomb sandwich panel 10 attached to the lower outer panel 8B, if the inner skin 13 with the drainage channels 14 drilled therethrough is not provided, moisture which turns into droplets and falls from the upper honeycomb sandwich panel 10 unfailingly enters the lower honeycomb core 11. By contrast, the provision of the inner skin 13, although it includes the drainage channels 14, can reliably reduce the likelihood that moisture which turns into droplets and falls from the upper honeycomb sandwich panel 10 enters the lower honeycomb core 11.

While the present invention has been described on the basis of the preferred embodiment, the configurations presented in the above embodiment can be selectively adopted or appropriately modified into other configurations within the scope of the present invention.

For example, the drainage channels 14 in the shown example are circular holes which penetrate the inner skin 13 in the thickness direction, but the drainage channels may have any form as long as moisture having entered the cells S can be discharged to the outside of the inner skin 13.

Figure 5A:
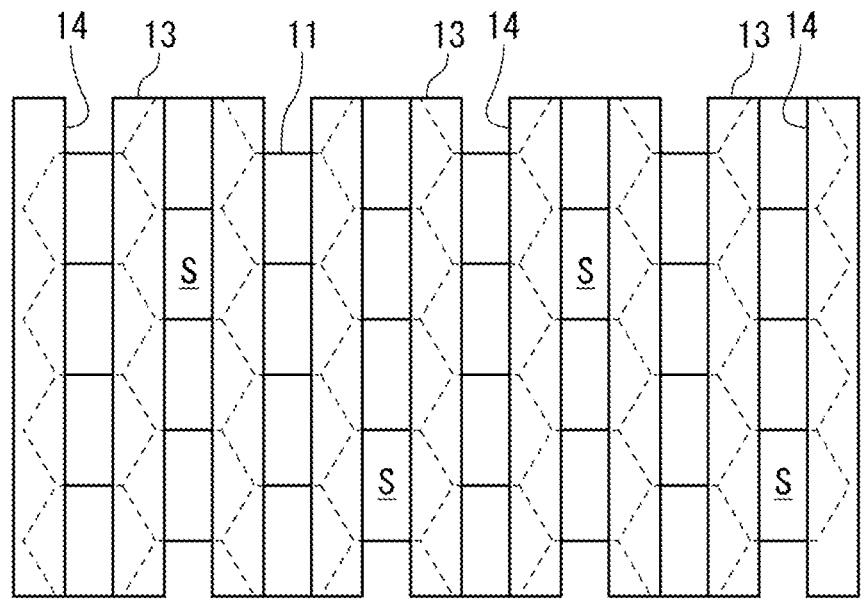
FIGS. 5A and 5B are plan views showing modified examples of the honeycomb sandwich panel in the embodiment.

For example, as shown in FIG. 5A, it is possible to provide strip-shaped inner skins 13 at intervals to use these intervals as the drainage channels 14.

Figure 5B:
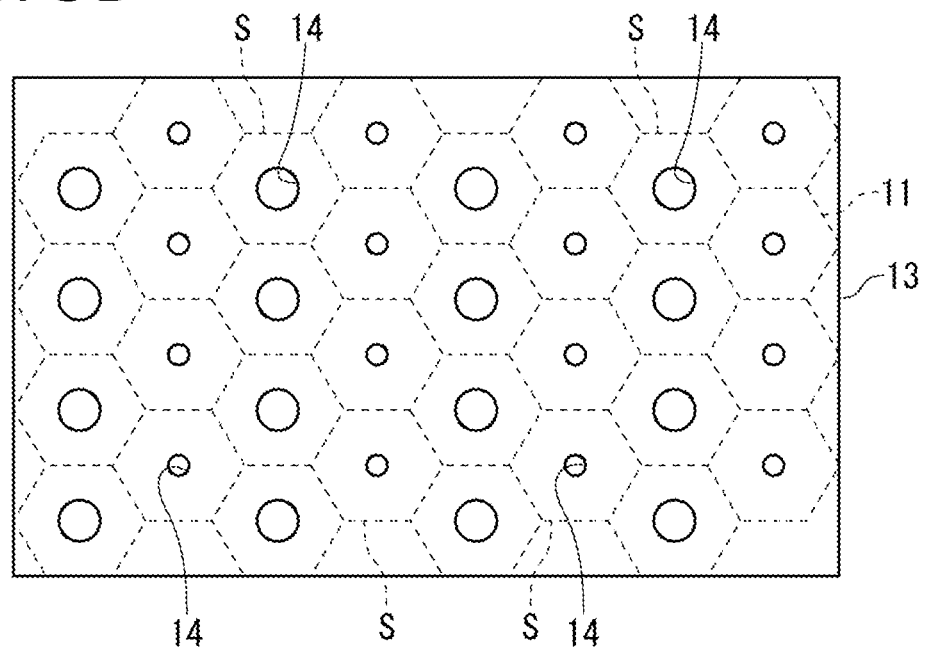

Alternatively, as shown in FIG. 5B, the size of the drainage channels 14 can be varied among the cells S.

Moreover, the drainage channels 14 corresponding to the upper outer panel 8A and the drainage channels 14 corresponding to the lower outer panel 8B can be varied from each other in opening dimension. For example, to avoid entry of moisture which turns into droplets and falls from the upper honeycomb sandwich panel 10, the opening dimension of the lower drainage channels 14 can be reduced.

The drainage channels in the present invention are not limited to the form of holes or slits which penetrate the inner skin 13 in the thickness direction, but the inner skin 13 is provided with at least a region which allows passage of vaporized moisture. One typical example is a moisture permeable fiber material. A moisture permeable fiber material is a material which, when it forms a skin, for example, allows passage of humidity but does not allow passage of moisture which turns into droplets. This material is known as Gore-Tex®, and forming the inner skin 13 from this moisture permeable material would be the same as forming the drainage channels 14 throughout the entire surface of the inner skin 13.

In the above embodiment, the tailplanes are taken as an example of the stressed-skin structure. However, the embodiment can also be applied to other reinforcing structures than the tailplanes of an aircraft to which a honeycomb sandwich panel is attached, for example, to main wings 5L, 5R (FIG. 1).

What is claimed is:

1. A reinforcing structure of an aircraft comprising an outer panel and a honeycomb sandwich panel, the outer panel constituting an outer shell of an airframe of a wing of the aircraft, the honeycomb sandwich panel reinforcing the outer panel, wherein
the outer panel is composed of an upper outer panel and a lower outer panel disposed on the lower side of the upper outer panel,
the upper outer panel and the lower outer panel are each provided with the honeycomb sandwich panel,
the outer panel is a component separate from the honeycomb sandwich panel,
the honeycomb sandwich panel includes:
a honeycomb core having a plurality of cells;
an outer skin disposed on an inner side of the outer panel; and
an inner skin defining an inner side of the reinforcing structure,
wherein the outer skin of the honeycomb sandwich panel is disposed on the inner side of the upper outer panel or the inner side of the lower outer panel and the inner skin of the honeycomb sandwich panel is disposed away from the upper outer panel and the lower outer panel,
the honeycomb core disposed between the outer skin and the inner skin, the outer skin joined on a front side of the honeycomb core and the inner skin joined on a back side of the honeycomb core, and
the inner skin has drainage channels formed therein through which each of the plurality of cells communicates with an outside of the honeycomb sandwich panel and the outer skin is free of drainage channels.

2. The reinforcing structure according to claim 1, wherein the drainage channels are holes and each hole corresponds to one of said plurality of cells and penetrates the inner skin in a thickness direction.

3. The reinforcing structure according to claim 1, wherein the drainage channels are slits which are formed by disposing strip-shaped inner skins at intervals and formed across a plurality of the cells.

4. The reinforcing structure according to claim 1, wherein the size of the drainage channels are varied among the cells.

5. The reinforcing structure according to claim 1, wherein the drainage channels corresponding to the lower outer panel has opening dimensions more reduced than those of the drainage channels corresponding to the upper outer panel.

6. The reinforcing structure according to claim 1, wherein the inner skin is formed from a moisture permeable fiber material and the drainage channels are formed throughout an entire surface of the inner skin.

7. An aircraft comprising the reinforcing structure according to claim 1.

8. The reinforcing structure according to claim 1, wherein the outer skin is a component separate from the outer panel.

9. The reinforcing structure according to claim 1, wherein the drainage channels are configured such that moisture having entered inside of the honeycomb sandwich panel is discharged through the drainage channels to the outside of the honeycomb sandwich panel.

10. The reinforcing structure according to claim 1, wherein both the outer skin and the inner skin are composed of fiber reinforced plastics.

11. The reinforcing structure according to claim 1, wherein the wing is a main wing or a tailplane of the aircraft.

* * * * *